United States Patent [19]

Hullah

[11] Patent Number: 4,693,901
[45] Date of Patent: Sep. 15, 1987

[54] SHELF STABLE DAIRYLIKE PRODUCTS

[75] Inventor: William Hullah, Don Mills, Canada

[73] Assignee: Cardinal Biological, Ltd., Ontario, Canada

[21] Appl. No.: 807,524

[22] Filed: Dec. 10, 1985

[51] Int. Cl.$^4$ ............................................. A23D 5/04
[52] U.S. Cl. .................... 426/330.6; 426/613; 426/334
[58] Field of Search ............... 426/573, 654, 580, 582, 426/613, 330.6, 330.2, 334

[56] References Cited

U.S. PATENT DOCUMENTS 3,391,002  7/1968  Little ..................................... 426/654
3,454,405  7/1969  Beach .................................. 426/654
3,993,793  11/1976  Finney ................................ 426/654

OTHER PUBLICATIONS

Avicel Applications Bulletin, #RC-26, FMC Corporation, Marcus Hook, Pa., Jun. 1971.
Avicel Applications Bulletin, #RC-28, FMC Corp., Marcus Hook, Pa., Aug. 1972.
Avicel Applications Bulletin, #RC-6, FMC Corp., Marcus Hook, Pa., 3-1972.
Avicel Applications Bulletin, #RC-8, FMC Corp., Marcus Hook, Pa., 3-1972.

Primary Examiner—Jeanette Hunter
Attorney, Agent, or Firm—Browdy and Neimark

[57] ABSTRACT

A shelf-stable dairylike product based on milk solids, oils, and emulsifiers, stablilized with a combination of microcrystalline cellulose and sodium carboxymethyl cellulose.

3 Claims, No Drawings

SHELF STABLE DAIRYLIKE PRODUCTS

FIELD OF THE INVENTION

The present invention relates to a stabilizer system for a dairy-like base for dips, dressings, cheese-like fillings, and the like which can withstand heat processing so that cans of the product are shelf stable.

BACKGROUND OF THE INVENTION

Dips for potato or other crisp chips have become increasingly popular. The original dips were based on sour cream, cream cheese, or other similar dairy products, and required the user to mix the sour cream with flavoring agents to produce a dip. These dips were not long lasting, and needed to be made up fresh for each use.

Later, formulations were produced which could be used for dip bases and included various gums or combinations of gums to stabilize fresh sour cream or cream cheese mixtures, which mixtures still required refrigerated storage. Shelf stable products were limited to dry mix powers which do not approach the quality of fresh dairy dips, or canned products that are primarily made of thick processed cheese, or bean or tomato, and bear no resemblance to a creamy dairy dip.

Prior art formulations for creamy dairy like chip dip bases usually included various gums, usually in combination with pregelatinized starch. Xanthan, carrageenan, or locust bean gums are often recommended for use in combination with pregelatinized corn starch. These mixtures can produce a thick creamy base, but the base will not withstand the heat processing involved in canning the product. After heat processing, the typical problems which occur are excessive whey loss during processing or upon shelf storage, and textural problems such as excessive curdling during processing or grittiness of the product which is not characteristic of a dairy based product. Heat processing of other diary-like bases using micro crystalline cellulose gives products which demonstrate textural problems of gumminess and gelation.

SUMMARY OF THE INVENTION

The present invention provides a stabilizer system for preparing a product having a dairy-like base which can withstand sufficient heat processing to provide shelf stable cans of the product. The stabilizer system comprises a combination of microcrystalline cellulose and sodium carboxymethyl cellulose in a base of milk solids, oils or partially hydrogenated oils, emulsifiers, acids, and phosphates. The texture of the product according to the present invention may that of fresh sour cream, fresh cream cheese, fresh cream, or fresh farmer cheese, depending upon the amount of stabilizer included in the formutation.

Microstalline cellulose, which is marketed by FMC Corporation as Avicel, is a nonfibrous form of cellulose in which the cell wall of plant fibers has been broken into fragments ranging in length from a few hundred microns to a few tenths of a micron. Only the physical form of the cellulose is changed; the microcrystalline cellulose is not a chemical derivative, but a purfied alpha cellulose.

Microstalline cellulose is made by spray drying washed, acid-treated cellulose which results in porous, plastic, and compressible particles. U.S. Pat. Nos. 2,978,446 and 3,141,875 disclose methods of preparing microcrystalline cellulose aggregates. Colloidal microcrystalline cellulose is made by reducing the particle size of washed, acid-treated cellulose by mechanical attrition before drying. Food grade sodium carboxymethylcellulose (NaCMC) is added to the products before drying to aid in re-dispersion of the particles. The level of CMC added ranges from approximately 8.5 to 15.0%, according to the specific colloidal microcrystalline product made. These powders are insoluble in water, but disperse in water to form colloidal sols and white opaque gels.

Sodium carboxymethylcellulose, abbreviated CMC, and sometimes referred to as cellulose gum, is an anionic, water-soluble polymer derived from cellulose. There are various types available, with different degrees of substitution, and within these types there are several viscosity grades.

The dairy like products according to the present invention include, in addition to the stabilizer, milk solids, oils, emulsifiers, food grade acids, flavoring agents, and water.

The ingredients of the dairylike products may be used in a range of percentages, as follows:

|  | % by weight |
| --- | --- |
| microcrystalline cellulose | 0.20–1.5 |
| sodium carboxymethylcellulose | 0.01–1.0 |
| milk solids | 5.0–25.0 |
| oil | 4.0–50.0 |
| emulsifier | 0.2–4.0 |
| phosphate | 0.03–0.7 |
| acids to pH | 2.5–4.6 |
| water | q.s. to 100% |

The food grade acids to be used in the products of the present invention are used to lower the pH of the product to below 4.6 but not below 2.5. Food grade acids that can be used for this purpose include acetic acid, citric acid, tartaric acid, fumaric acid, and lactic acid, and mixtures thereof.

The use of the stabilizer of the present invention, the microcrystalline cellulose-sodium carboxymethylcellulose combination, with an appropriate combination of the other ingredients, will result in a highly acceptable diary-like product base. The base can be flavored as desired with spices, liquid or powered flavorings, and herbs. Particulates can be added to provide visual appeal. The particular acids and their amounts can be varied to best suit the flavoring used, as the flavoring used may alter the pH slightly or necessitate the use of less acid. The amount of stabilizer can be varied to provide products of varying visosity.

DESCRIPTION OF THE PREFERRED EMBODIMENTS

EXAMPLE I

Taco Flavored Canned Chip Dip

| Ingredients | Weight in grams |
| --- | --- |
| Water | 650 |
| Microcystalline cellulos (Avicel RC-591) | 3.0 |
| Sodium Carboxymethylcellulose (Hercules 9H 4XF) | 0.45 |
| Milk solids, high temperature stable (Stacy Brothers) | 90 |
| Sodium hexamtaphosphate | 3 |
| Glycerol | 10 |
| Partially hydrogented soya oil | 90 |

| Ingredients | Weight in grams |
| --- | --- |
| (Durkee-Kaomel) | |
| High Stability oil (Durkex 500) | 30 |
| Citric acid | 3.5 |
| Taco seasoning (stange) | 46 |
| Chili powder | 6 |

To prepare the chip dip having the above ingredients, the Avicel is predispersed in 500 ml of cold water for two minutes in a Warning blender. The sodium carboxymethylcellulose is added, and the mixture is blended to two more minutes. The sodium hexametaphosphate, milk solids, and glycerol are added and blended until well mixed. The mixture is heated to 70 degrees C. Emulsifier, oil, and Kaomel are added while blending. Blending is continued while adding citric acid (predispersed in remaining 150 ml water), taco seasoning, and chili power. The mixture is heated to 90 degrees C., and the mixture is hot filled into cans. The cans are sealed and processed in boiling water for about 18 minutes. The cans are then cooled immediately in cold water.

EXAMPLE II

Onion Flavored Canned Chip Dip

| Ingredients | Weight in Grams |
| --- | --- |
| Water | 600 |
| Microcystalline Cellulose (Avicel RC-591) | 3.5 |
| Sodium carboxymethyl Cellulose (Hercules 9H 4XF) | 0.45 |
| Milk solids, high temperature stable (Stacey brothers) | 90 |
| Sodium hexametaphosphate | 3 |
| Glycerol | 10 |
| Emulsifier | 11 |
| Partially Hydrogenated Soya oil (Durkee-Kaomel) | 90 |
| High stability oil (Durkex 500) | 30 |
| Citric acid | 4 |
| Onion flavor (powered-Stange) | 20 |
| Onion Seasoning (UFL) | 40 |

To prepare the chip dip, the Avicel is predispersed in 500 ml of cold water for two minutes in a Waring Blender. The sodium carboxymethyl cellulose is added, and blending is continued for two minutes. Sodium hexametaphosphate, milk solids, and glycerol are added, and the mixture is blended until well mixed. The mixture is then heated to 70° C., and emulsifier, oil, and Kaomel are added while blending. Citric acid, predispersed in the remaining 100 ml. water, vinegar, and onion flavor are added. Onion seasoning is added at the end, without further blending. The mixture is then heated to 90° C., and the mixture is hot filled into cans. The cans are sealed, processed in boiling water for eighteen minutes, and are cooled immediately in cold water.

EXAMPLE III

Dill flavored Canned Chip Dip

| Ingredients | Weight in grams |
| --- | --- |
| Water | 600 |
| Microcrystalline cellulos (Avicel RC-591) | 6 |
| Sodium carboxymethyl cellulose (Hercules 9H 4XF) | 0.6 |
| Milk solids, high temperature stable (Stacey brothers) | 90 |
| Sodium hexametaphosphate | 3 |
| Glycerol | 10 |
| Emulsifier | 11 |
| Partially hydrogenated soya oil (Durkee-Kaomel) | 90 |
| high stability oil (Durkex 100) | 30 |
| Citric acid | 3.0 |
| Vinegar | 2.5 |
| Dill weed | 1.5 |
| Garlic, granulated | 3.0 |

The Avicel is predispensed in 500 ml cold water for two minutes in a Waring Blender. Sodium carboxymethyl cellulose, added, and blending is continued for two minutes.

Sodium hexametaphosphate, milk solids, and glycerol are added and blended until well mixed. The mixture is then heated to 70° C. Emulsifier and Kaomel are added while blending. Blending is continued while adding citric acid predispensed in remaining 100 ml. water, vinegar, salt, and garlic. Dill is added after blending is complete. The mixture is hot filled into cans, sealed, and processed in boiling water for eighteen minutes. The cans are then cooled immediately in cold water.

EXAMPLE IV

Blue Cheese Flavored Salad Dressing

A shelf-stable salad dressing is prepared according to the method of Example I from the following ingredients:

| Ingredients | Weight in Grams |
| --- | --- |
| Water | 600 |
| Microcrystalline cellulose (Avicel RC-591) | 2.5 |
| Sodium carboxymethyl cellulose (Hercules 9H 4XF) | 0.20 |
| Milk solids, high temperature stable | 90 |
| Sodium hexametaphosphate | 3 |
| Glycerol | 10 |
| Emulsifier | 11 |
| High stability oil | 125 |
| Citric acid | 4 |
| Onion flavor | 10 |
| Blue cheese flavor | 40 |

EXAMPLE V

Cheese Filling

A cheese-type filling for savory filled cheese dishes is made from the process of Example I using the following ingredients:

| Ingredients | Weight in grams |
| --- | --- |
| Water | 600 |
| Microcrystalline cellulose | 8 |
| Sodium carboxymethyl cellulose | 6.5 |
| Milk solids, high temperature stable | 100 |
| Sodium hexametaphosphate | 4 |
| Glycerol | 10 |
| Emulsifier | 12 |
| Partially hydrogenated soya oil | 150 |
| Cream cheese flavor | 60 |

The amount of stabilizer can be varied to provide products with a variety of viscosity. This viscosity of the shelf-stable product can be varied to provide products having the consistency of heavy cream for salad dressings, of sour cream or cream cheese for chip or vegetable dips, and for more solid cheeses such as ricotta or farmer cheese for fillings for products such as ravioli or pierogies.

What is claimed is:

1. A shelf-stable, dairylike product having a dairylike taste and a texture similar to that of sour cream, cream cheese, or fresh cream, comprising from about 5.0 to about 25.0 parts by weight of milk solids, from about 4.0 to about 50.0 parts by weight of oil, from about 0.2 to about 4.0 parts by weight of emulsifiers, from about 0.003 to about 0.7 parts by weight of a phosphate, and sufficient food grade acid to lower the pH to from about 2.5 to about 4.6, and a stabilizer comprising a combination of from about 0.20 to about 1.5 parts by weight of microcrystalline cellulose and from about 0.01 to about 1.0 parts by weight of carboxylmethyl cellulose, wherein the amount of stabilizer is adjusted to impart the desired texture to the product.

2. The shelf-stable, dairylike product of claim 1 wherein the food grade acid is selected form the group consisting of acetic acid, tartaric acid, citric acid, fumaric acid, lactic acid, and mixtures thereof.

3. The shelf-stable, dairylike product of claim 1 wherein the texture is that of sour cream.

* * * * *